United States Patent
Ho et al.

(10) Patent No.: US 12,143,823 B2
(45) Date of Patent: Nov. 12, 2024

(54) METHOD FOR IMPLEMENTING REQUEST FROM APP BY SIM IN MOBILE PHONE

(71) Applicant: Taisys Technologies Co., Ltd., Taipei (TW)

(72) Inventors: Chun Hsin Ho, Taipei (TW); Chih Nung Wang, Taipei (TW); Chien Chou Chen, Taipei (TW); Chin Chang Wu, Taipei (TW)

(73) Assignee: Taisys Technologies Co., Ltd., Taipei (TW)

( * ) Notice: Subject to any disclaimer, the term of this patent is extended or adjusted under 35 U.S.C. 154(b) by 406 days.

(21) Appl. No.: 17/825,063

(22) Filed: May 26, 2022

(65) Prior Publication Data

US 2023/0388801 A1    Nov. 30, 2023

(51) Int. Cl.
*H04W 12/06* (2021.01)
*H04W 8/18* (2009.01)
*H04W 12/30* (2021.01)

(52) U.S. Cl.
CPC .......... *H04W 12/35* (2021.01); *H04W 8/183* (2013.01); *H04W 12/06* (2013.01)

(58) Field of Classification Search
CPC ..... H04W 12/35; H04W 8/183; H04W 12/06; H04W 12/033
See application file for complete search history.

(56) References Cited

U.S. PATENT DOCUMENTS

| | | | |
|---|---|---|---|
| 9,241,058 B2 * | 1/2016 | Jain | H04W 72/51 |
| 9,591,476 B2 * | 3/2017 | Lodeweyckx | H04W 12/06 |
| 2014/0079219 A1 * | 3/2014 | Yigit | H04W 12/033 380/270 |
| 2017/0026825 A1 * | 1/2017 | Yang | H04W 8/183 |
| 2017/0033823 A1 * | 2/2017 | Smith | H04W 8/18 |
| 2017/0196088 A1 * | 7/2017 | Ho | H05K 1/144 |
| 2017/0201876 A1 * | 7/2017 | Tamagawa | H04W 8/183 |
| 2017/0367085 A1 * | 12/2017 | Chakraborty | H04W 36/0072 |
| 2018/0035281 A1 * | 2/2018 | Erginler | H04W 8/183 |
| 2021/0084488 A1 * | 3/2021 | Sevindik | H04W 8/183 |
| 2021/0168605 A1 * | 6/2021 | Dagirov | H04W 12/06 |
| 2021/0289429 A1 * | 9/2021 | Marsden | H04W 8/04 |
| 2022/0272084 A1 * | 8/2022 | Hyatt | H04W 12/40 |

* cited by examiner

*Primary Examiner* — Julio R Perez
(74) *Attorney, Agent, or Firm* — Demian K. Jackson; Jackson IPG PLLC

(57) ABSTRACT

A method for implementing requests from an app by a SIM in a mobile phone comprises the steps of: binding an app to a BIP server by a mobile phone; delivering a request command to the BIP server from the mobile phone; converting the request command to an APDU format, packing the converted request command in the APDU format in a request packet, and delivering the request packet to an IP of a SIM by the BIP server; receiving and unpacking the request packet to have the converted request command, and providing the converted request command to the SIM; executing the request command to have a result by the SIM; delivering the result in a response packet to the BIP server via the mobile network relayed; unpacking the response packet to fetch the result, and delivering the result to the mobile phone for the app by the BIP server.

32 Claims, 7 Drawing Sheets

METHOD FOR IMPLEMENTING REQUEST FROM APP BY SIM IN MOBILE PHONE

FIELD OF THE INVENTION

The present invention relates to a method for implementing request from an app. More particularly, the present invention relates to a method for implementing request from an app by a SIM in a mobile phone.

BACKGROUND OF THE INVENTION

In a communication device, such as a mobile phone, communication and cooperation between software and hardware may not be allowed. If possible, it may need to come through the system operator. An obvious example is the interaction between APP and Subscriber Identity Module (SIM) in the mobile phone. Any data and application in the SIM can be accessed and updated in two ways: one is that the mobile operator issues instructions to the SIM card through OTA server for the APP, and the other is that the APP communications with the SIM card through the menu on the SIM tool kit (STK) to activate certain functions from time to time. Realization of the functions is mostly done by the modem side, which involves short message service protocol or bearer independent protocol (BIP) protocol. However, not all mobile operators provide service for APP developer to access the SIM through their hardware architecture. Meanwhile, not all operating systems of the mobile phones permit APP to utilize BIP to access the SIM.

Today, the SIM (card) is not only used to store user identification data, text message data and phone numbers. Because the SIM is not easily accessible and has the convenience to carry and transfer, the SIM has been used to store confidential and high-value information. For example, the SIM may store public and private keys of cryptocurrency as a cold wallet. For a smooth channel to fetch or updated the stored information, a control APP has to access the SIM without any obstacle therebetween. As mentioned above, this is so far not available.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

A method for implementing requests from an app by a SIM in a mobile phone is disclosed. It comprises the steps of: a) binding an app to a bearer independent protocol (BIP) server by a mobile phone where the app is installed; b) delivering a request command to the BIP server from the mobile phone by the app; c) converting the format of the request command to an Application Protocol Data Unit (APDU) format, packing the converted request command in the APDU format in a request packet, and delivering the request packet to an IP of a SIM by the BIP server via a mobile network; d) receiving and unpacking the request packet to have the converted request command, and providing the converted request command to the SIM by the mobile phone; e) executing the request command to have a result by the SIM; f) delivering the result in a response packet to the BIP server via the mobile network relayed by the mobile phone by the SIM; g) unpacking the response packet to fetch the result, and delivering the result to the mobile phone for the app by the BIP server. Data delivered between the SIM and the BIP server via the mobile phone is encrypted.

Another method for implementing requests from an app by a SIM in a mobile phone is also disclosed. It comprises the steps of: a) binding an app to a BIP server by a mobile phone where the app is installed; b) delivering an encrypting request command with an object to the BIP server by the mobile phone; c) cutting the object into a plurality of pieces, converting a plurality of amended encrypting request commands in an APDU format from the encrypting request command, and packing each amended encrypting request command with a specific piece in a request packet, respectively, by the BIP server; d) delivering one request packet to an IP of a SIM by the BIP server via a mobile network; e) receiving and unpacking the request packet to have the amended encrypting request command and corresponding piece, and providing the amended encrypting request command with the piece to the SIM by the mobile phone; f) executing the amended encrypting request command to encrypt the piece according to an encryption algorithm to have an initial result by the SIM; g) packing the initial result in a response packet and delivering the response packet to the mobile phone by the SIM; h) delivering the response packet to the BIP server via the mobile network by the mobile phone; i) repeating the step d) to the step h) for the other request packet; and j) unpacking the response packets to fetch the initial results, combining the encrypted pieces as an encrypted object in a final result, and delivering the final result to the mobile phone for the app by the BIP server. Data delivered between the SIM and the BIP server via the mobile phone is encrypted.

Still another method for implementing requests from an app by a SIM in a mobile phone is disclosed. It comprises the steps of: a) binding an app to a BIP server by a mobile phone where the app is installed; b) delivering a decrypting request command with an encrypted object to be decrypted to the BIP server by the mobile phone; c) cutting the object into a plurality of pieces, converting a plurality of amended decrypting request commands in an APDU format from the decrypting request command, and packing each amended decrypting request command with a specific piece in a request packet, respectively, by the BIP server; d) delivering one request packet to an IP of a SIM by the BIP server via a mobile network; e) receiving and unpacking the request packet to have the amended decrypting request command and corresponding piece, and providing the amended decrypting request command with the piece to the SIM by the mobile phone; f) executing the amended decrypting request command to decrypt the piece according to an encryption algorithm to have an initial result by the SIM; g) packing the initial result in a response packet and delivering the response packet to the mobile phone by the SIM; h) delivering the response packet to the BIP server via the mobile network by the mobile phone; i) repeating the step d) to the step h) for the other request packet; and j) unpacking the response packets to fetch the initial results, combining the decrypted pieces as a decrypted object in a final result, and delivering the final result to the mobile phone for the app by the BIP server. Data delivered between the SIM and the BIP server via the mobile phone is encrypted.

Preferably, data between the BIP server and the mobile phone is conformed to Hyper Text Transfer Protocol (HTTP).

Preferably, the result unpacked from the response packet is further converted to a format of JSON.

Preferably, the communication processes between the mobile phone and the BIP server are further encrypted according to Hyper Text Transfer Protocol Secure (HTTPS) protocol.

Preferably, the request command is verifying an attached Personal Identification Number (PIN) and the SIM compares the PIN with a preset value.

Preferably, the request command is selecting a file and the SIM provides names of all files stored therein as the result.

Preferably, the request command is reading a selected file and the SIM provides the selected file stored therein as the result.

Preferably, the encryption algorithm is Advanced Encryption Standard (AES) or Rivest-Shamir-Adleman (RSA).

Preferably, a type of the SIM is a slim SIM, an eSIM, an integrated SIM (iSIM) or a SIM card.

Preferably, the step a) further comprises sub-steps of: a1) delivering a token request with an inputted third party number for an app to a BIP server by a mobile phone where the app is installed; a2) delivering a temporary permission token to the app via the mobile phone by the BIP server; a3) delivering a binding request for the app to the BIP server by the mobile phone; and a4) binding the third party number with a registered number in the BIP server, providing a permanent token to the app and delivering a successful binding message to the app via the mobile phone by the BIP server.

Preferably, it further comprises steps of: a5) delivering a failed binding message with a binding code to the app via the mobile phone by the BIP server when the step a4) is failed; a6) delivering the binding code to the BIP server for rebinding by the mobile phone; and a7) binding the third party number with a registered number in the BIP server again, providing another permanent token to the app and delivering a successful binding message to the app via the mobile phone by the BIP server.

With the BIP server, communication between the app and the SIM in the mobile phone and becomes possible.

DETAILED DESCRIPTION OF THE PREFERRED EMBODIMENTS

Figure 1:
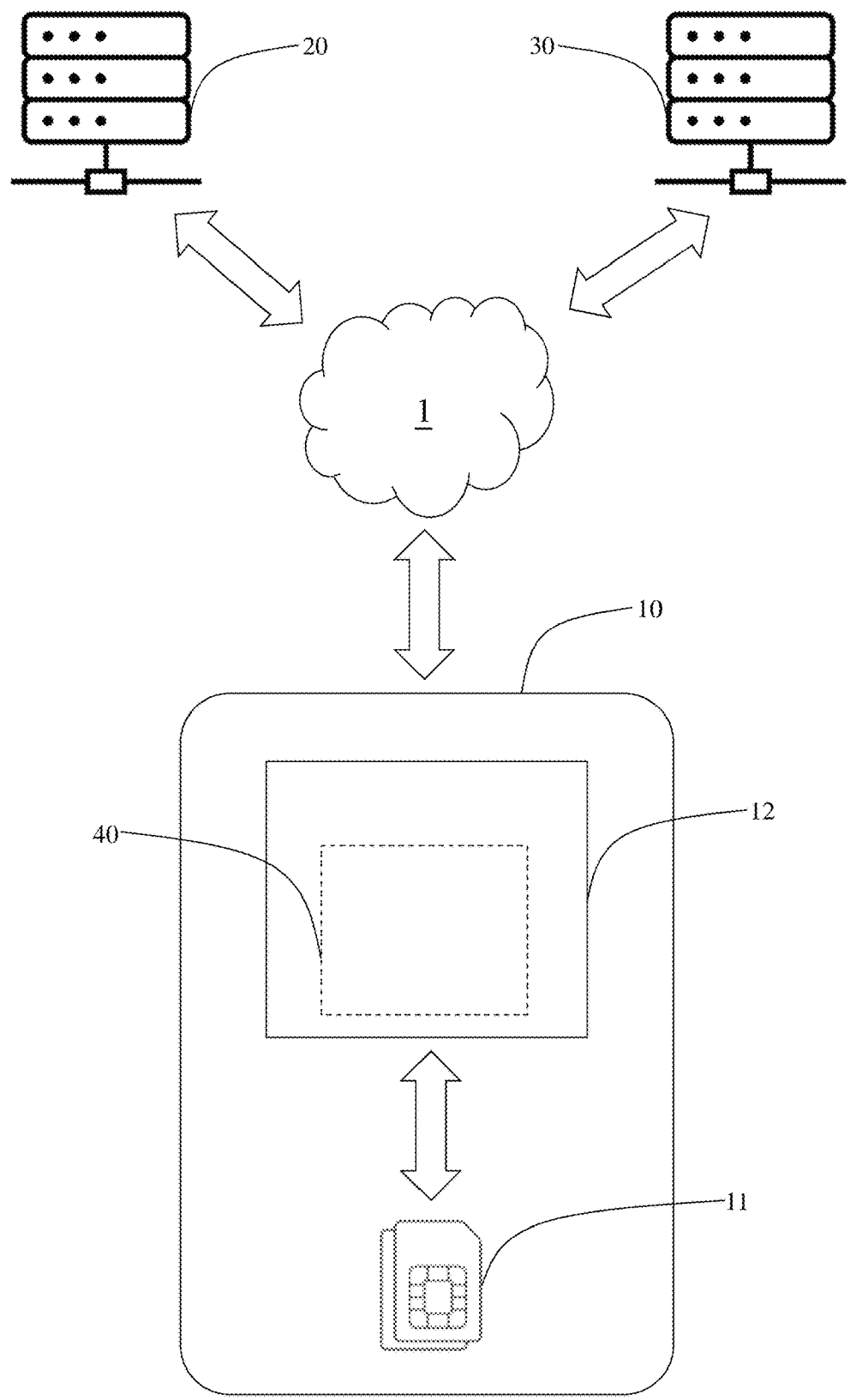
FIG. 1 shows an implementation architecture for the method for implement request from an app in a mobile according to the present invention.

The present invention will now be described more specifically with reference to the following embodiments.

Before the method for implement request from an app in a mobile (hereinafter referred to as the method) is disclosed, an implementation architecture for the method is illustrated. Please refer to FIG. 1. According to the present invention, a BIP server 20 is required. The BIP server 20 acts as an intermediary and a translator, for communicating between a SIM 11 in a mobile phone 10 and an app 40 operated by an operating system 12 of the mobile device 10. A type of the SIM may be a slim SIM, an eSIM, an integrated SIM (iSIM) or a SIM card. The BIP server 20 connects to the mobile phone 10 through a mobile network 1. If the app 40 is further controlled by an app server 30, the app server 30 is in the implementation architecture, too. The mobile phone 10 may be of other type, such as a tablet, a wear device, an internet of things (IOT) device, etc. In the embodiment, the mobile phone used is just for illustration. It should be emphasized that data between the BIP server 20 and the mobile phone 10 may be conformed to Hyper Text Transfer Protocol (HTTP) in the following embodiments, including request packets and response packet. Meanwhile, data delivered between the SIM 11 and the BIP server 20 via the mobile phone 10 may be encrypted. The communication processes between the mobile phone 10 and the BIP server may be further encrypted according to Hyper Text Transfer Protocol Secure (HTTPS) protocol.

Figure 2:
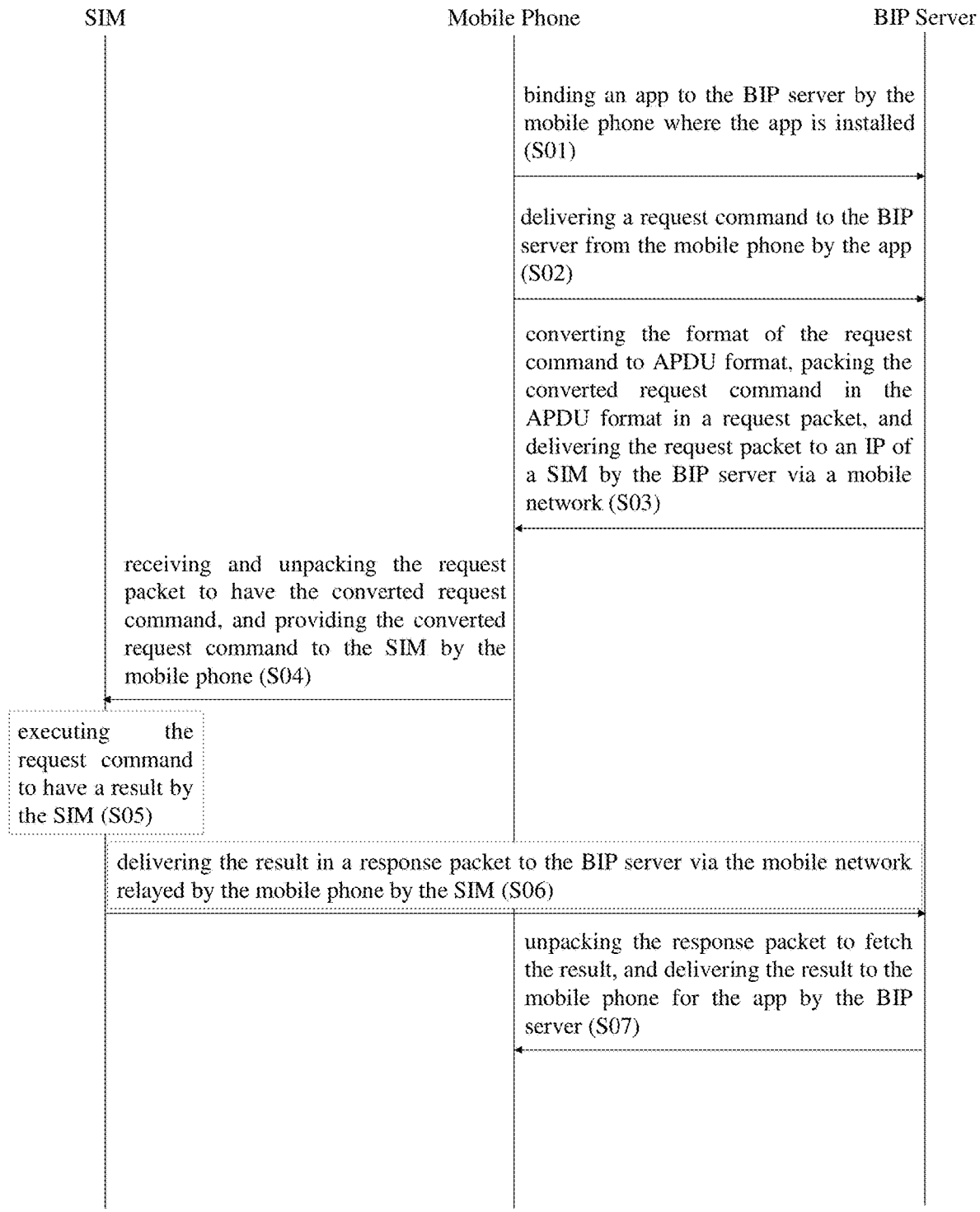
FIG. 2 is a flow chart of a first embodiment of a method according to the present invention.

Please refer to FIG. 2. It is a flow chart of a first embodiment of the method according to the present invention. The first embodiment discloses only how the SIM 11 is accessed by the app 40. A first step of the first embodiment is binding the app 40 to the BIP server 20 by the mobile phone 10 where the app 40 is installed (S01). Binding means establishing a "relation" between the app 40 and the BIP server 20, letting the BIP server 20 know the app 40 and accepts the app 40 for following steps. For some security reasons, not all app s, such as a malware, are allowed to work through the BIP server 20. Therefore, binding (or registration) is a must. There are many binding ways in the field of information technology and use of binding is not limited by the present invention. A recommendation will be provided later. Then, a second step of the first embodiment is delivering a request command to the BIP server 20 from the mobile phone 10 by the app 40 (S02). The request command is to ask the SIM 11 for something via the BIP server 20. For example, the request command may be verifying an attached Personal Identification Number (PIN). Thus, the SIM 11 will compare the PIN with a preset value stored therein after receiving the request command. The request command may also be selecting a file. The SIM 11 will provide names of all files stored therein as a result (definition of the result will be described in detail later) according to the request command. The request command may further be reading a selected file. The SIM 11 will provide the selected file, e.g., a file comprises a public key and a private key of cryptocurrency, stored therein as the result. The format of the request commend is not restricted. In practice, the mobile device 10 may implement communication with the BIP server 20 through BIP APIs.

Next, a third step of the first embodiment is converting the format of the request command to an (APDU) format, packing the converted request command in the APDU format in a request packet, and delivering the request packet to an IP of a SIM by the BIP server 20 via the mobile network 1 (S03). In this step, there are three sub-steps. The first sub-step is converting the format of the request command to the APDU format. APDU is a part of the application layer in the Open Systems Interconnection Reference model that is used for communication between two separate device's applications. In the context of smart cards, an APDU is the communication unit between a smart card reader and a smart card. Namely, use of APDU format for the request command is to let the SIM 11 know what the request command is with its language. It should be emphasized that converting is done by the BIP server 20, rather than the mobile phone 10 as the conventional way to do. The second sub-step is to pack the converted request command a request packet. Packing can be implemented by many methods, for example, adding header and footer to it. The third sub-step is to deliver the request packet. One of the important spirits of the present invention is that the delivery goes through a mobile network. It is not workable for telecommunications network. The purpose of this sub-step is to link the BIP server 20 with the SIM 11 and then process data delivery. If the mobile phone 10 goes through a telecommunications network, it might be behind a floating IP of an IP sharer. The BIP server 20 cannot find the SIM 11 with its IP.

The fourth step is receiving and unpacking the request packet to have the converted request command, and providing the converted request command to the SIM 11 by the mobile phone 10 (S04). When the request packet is unpacked, e.g., removing the header and the footer, the converted request command in APDU format is available. Then, the fifth step begins by executing the request command to have the result by the SIM 11 (S05). The result is defined as what responds to the request command. For example, if the request command is selecting a file, the result is a list of the names of all files. Definitions and examples of the request command and the result are applicable to other embodiments.

Next, the sixth step is delivering the result in a response packet to the BIP server 20 via the mobile network 1 relayed by the mobile phone 10 by the SIM 11 (S06). The response packet, like the request packet, is packed by a header and a footer for delivery. The format of the response packet is also APDU. The last step of the first embodiment is unpacking the response packet to fetch the result, and delivering the result to the mobile phone 10 for the app 40 by the BIP server 20 (S07). The result may be shown on the mobile phone 10 or sent to the app server 30 for further use. Preferably, result unpacked from the response packet can be further converted to a format of JSON which is readable by many apps.

In the first embodiment, the method provides a way to access the SIM 11 for the app 40. In a second embodiment, a method for implement request from an app in a mobile (hereinafter referred to as this method to distinguish from the method used in the first embodiment) according to the present invention can further ask the SIM 11 to encrypt an object, e.g., a file or a message in any format with an encryptor built in the SIM 11 is disclosed. In the description for the second embodiment, the implementation architecture in FIG. 1 is also applicable.

Figure 3:
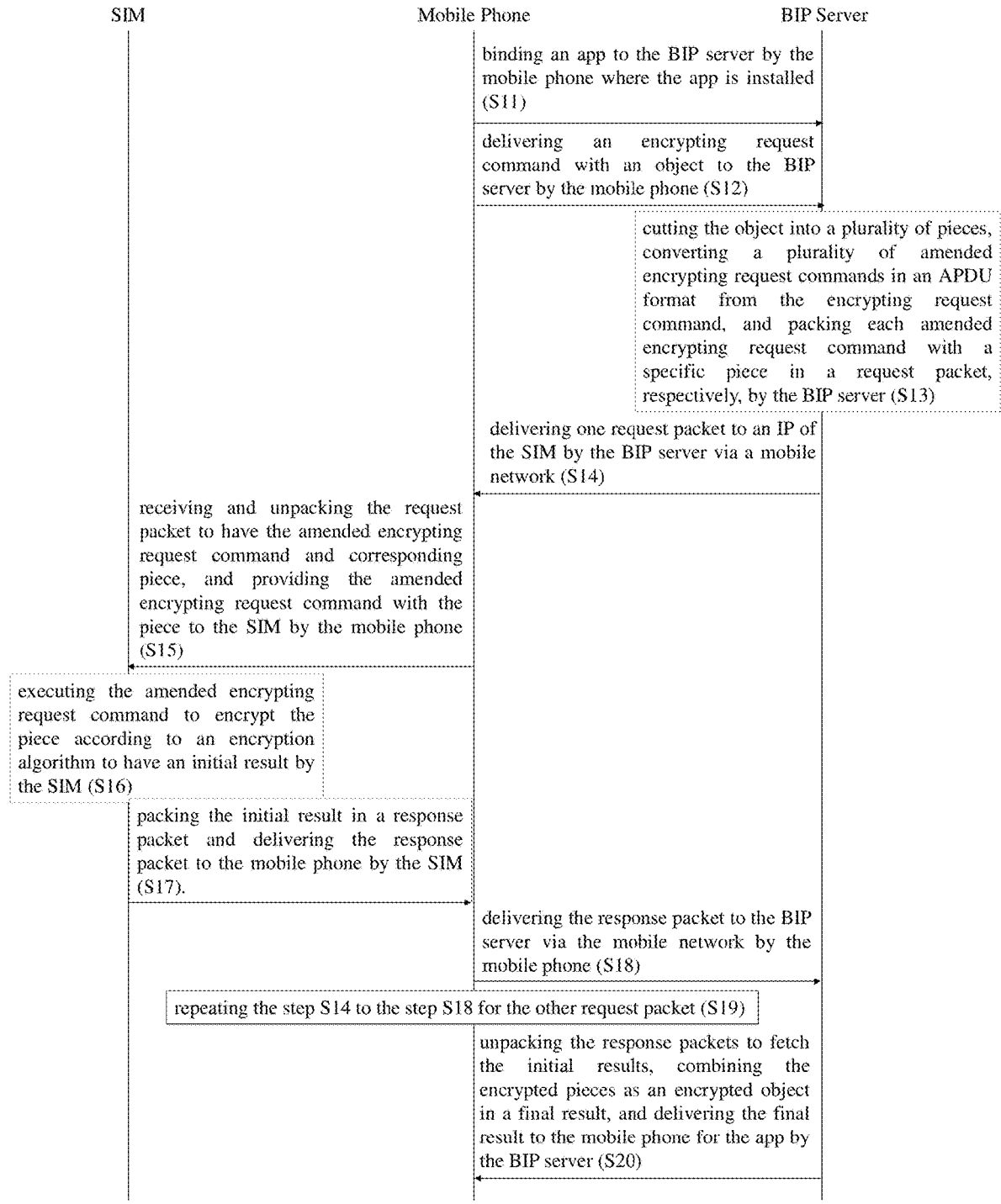
FIG. 3 is a flow chart of a second embodiment of another method according to the present invention.

Please refer to FIG. 3. It is a flow chart of the second embodiment of this method according to the present invention. The first step of the second embodiment is binding an app to the BIP server 20 by the mobile phone 10 where the app 40 is installed (S11). It is the same as the first step of the first embodiment so that the details are not mentioned again here. The second step of the second embodiment is delivering an encrypting request command with an object to the BIP server 20 by the mobile phone 10 (S12). This step is different from the second step of the first embodiment. The request command sent is specified to ask for an encryption on the object. Meanwhile, the step is carried out by the mobile phone 10, not necessary to be initiated by the app 40 according to the present invention.

Figure 4:
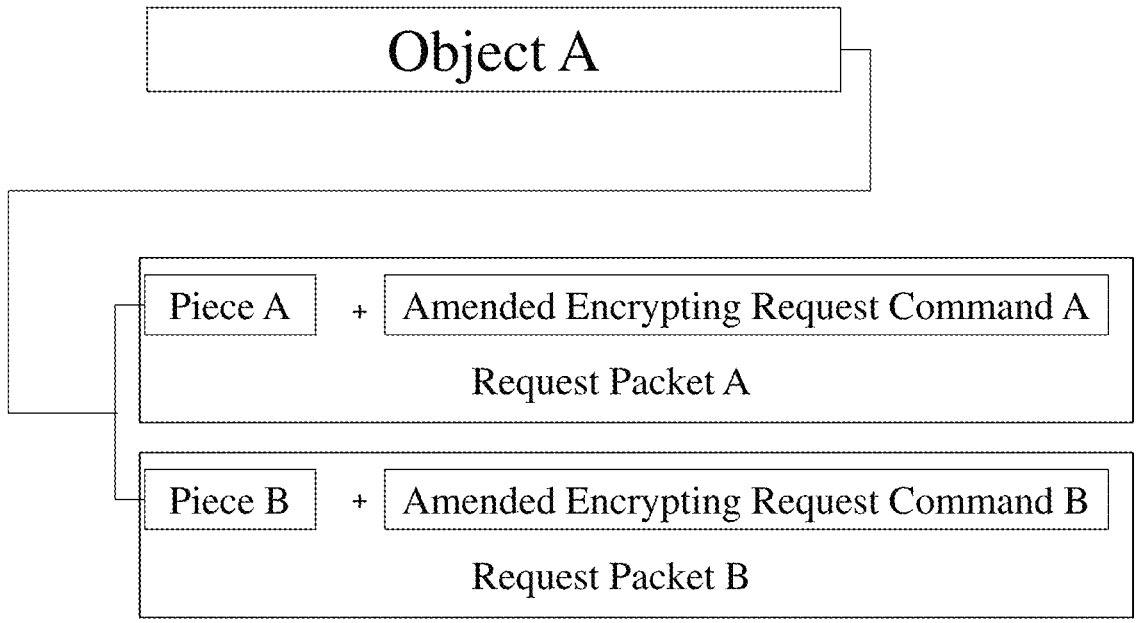
FIG. 4 illustrates how an object is changed by a BIP server.

Next, the third step of the second embodiment is cutting the object into a plurality of pieces, converting a plurality of amended encrypting request commands in an APDU format from the encrypting request command, and packing each amended encrypting request command with a specific piece in a request packet, respectively, by the BIP server 20 (S13). In order to have a better understanding on this step, please refer to FIG. 4. It illustrates how the object is changed by the BIP server 20. In FIG. 4, an object A is cut into two pieces, piece A and piece B. The cutting method may be cutting object into two separate files. It may also be cutting the object by bits. Piece A doesn't have to have the same size (bits) as piece B. The encrypting request command may be a script or a command for an API used by the SIM 11. The BIP server 20 will assign one amended encrypting request command in the APDU format for each piece. In FIG. 4, an amended encrypting request command A is attached to piece A and the amended encrypting request command A and piece A are packed in a request packet A. An amended encrypting request command B is attached to piece B and the amended encrypting request command B and piece B are packed in a request packet B. The amended encrypting request command A and the amended encrypting request command B will not only inform the SIM 11 to encrypt the attached piece but also have a message of connection that piece A and piece B are a part of the object A. Packing method is the same as what is disclosed in the first embodiment. It is not repeated again. The amended encrypting request commands are in APDU format so that the SIM 11 knows them.

The fourth step of the second embodiment is delivering one request packet to an IP of the SIM 11 by the BIP server 20 via the mobile network 1 (S14). The purpose of the step S14 is to deliver a request packet at a time. The way why the delivery goes through mobile network is also the same as what is disclosed in the first embodiment.

Next, a fifth step of the second embodiment is receiving and unpacking the request packet to have the amended encrypting request command and corresponding piece, and providing the amended encrypting request command with the piece to the SIM 11 by the mobile phone 10 (S15). Now, the request packet A is received and unpacked by the mobile phone 10 and the amended encrypting request command A and the piece A are provided to the SIM 11.

Then, the sixth step is executing the amended encrypting request command to encrypt the piece according to an encryption algorithm to have an initial result by the SIM 11 (S16). The amended encrypting request command A is executed so that piece A is encrypted. According to the present invention, the encryption algorithm may be and not limited to Advanced Encryption Standard (AES) and Rivest-Shamir-Adleman (RSA). The encrypted piece A is the initial result. The coming step of the second embodiment is packing the initial result in a response packet and delivering the response packet to the mobile phone 10 by the SIM 11 (S17). The response packet comprising piece A with some other description which may be in the form of header and footer is sent to the mobile phone 10. The eighth step is delivering the response packet to the BIP server 20 via the mobile network 1 by the mobile phone 10 (S18). Again, the response packet is further delivered to the BIP server 20.

Next, the ninth step of the second embodiment is repeating the step S14 to the step S18 for the other request packet (S19). It means delivering request packet B is delivered to the IP of the SIM 11 by the BIP server 20 via the mobile network 1, the mobile phone 10 receives and unpacks the request packet B to have the amended encrypting request command B and corresponding piece B, and provides the amended encrypting request command B with the piece B to the SIM 11, the SIM 11 executes the amended encrypting request command B to encrypt piece B according to the encryption algorithm to have another initial result, the SIM 11 packs the initial result in another response packet and delivers the response packet to the mobile phone 10, and the mobile phone 10 is further delivers the response packet to the BIP server 20 via the mobile network 1. The final step of the second embodiment is unpacking the response packets to fetch the initial results, combining the encrypted pieces as an encrypted object in a final result, and delivering the final result to the mobile phone 10 for the app 40 by the BIP server 20 (S20). In the BIP server 20, both response packets are unpacked, and corresponding initial results are obtained. The encrypted piece A and encrypted piece B are fetched and combined to have the encrypted object. The encrypted object is finally packed as the final result which is delivered to the mobile phone 10 for the app 40 to use.

This method in the second embodiment asks the SIM 11 to encrypt the object. On the other hand, according to the present invention, an encrypted object can also be decrypted by the SIM 11. In a third embodiment, a method for implement request from an app in a mobile (hereinafter referred to as said method to distinguish from the method used in the first embodiment and the second embodiment) further discloses the whole processes. In the description for the third embodiment, the implementation architecture in FIG. 1 is also applicable.

Figure 5:
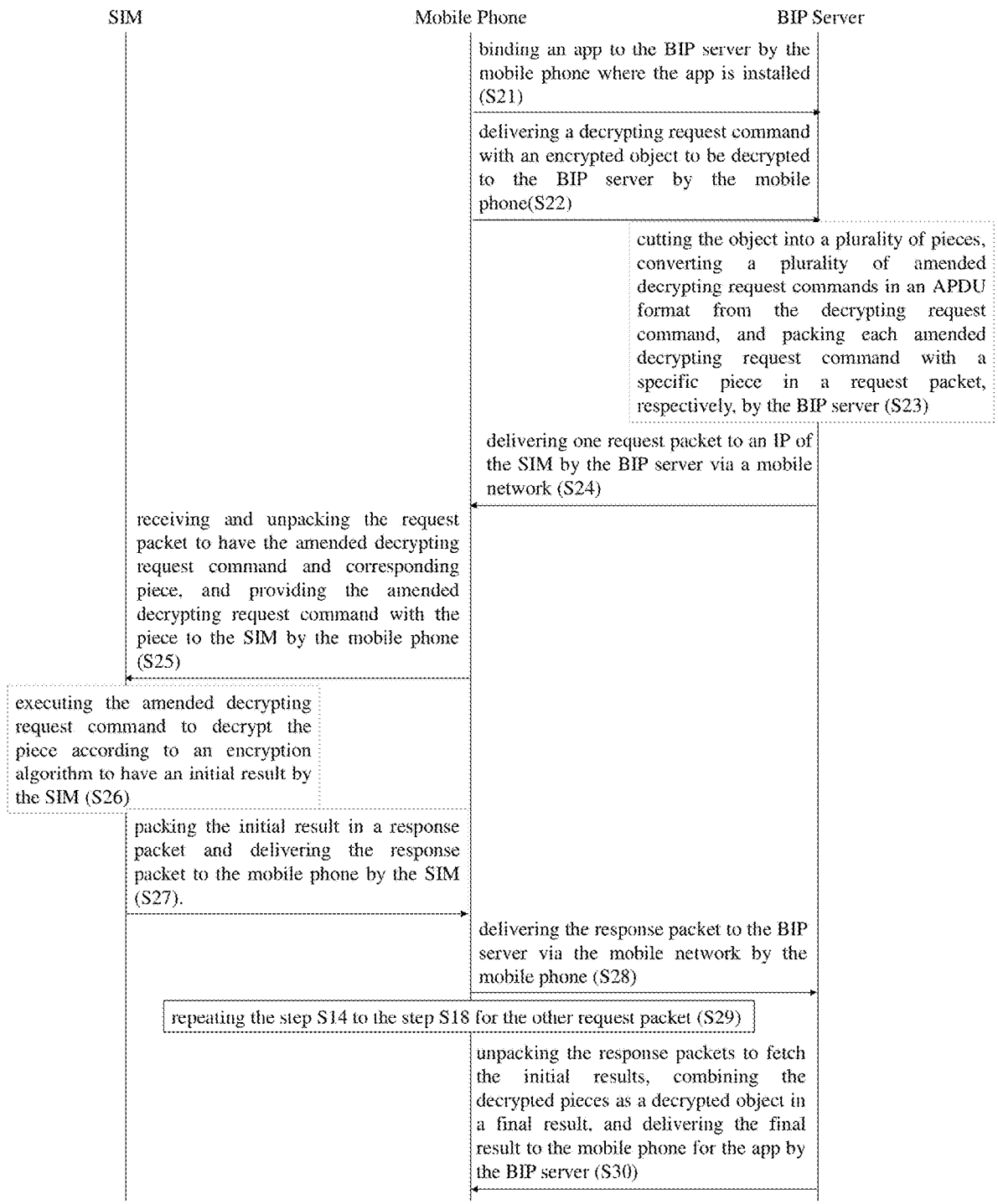
FIG. 5 is a flow chart of a third embodiment of another method according to the present invention.

Please refer to FIG. 5. It is a flow chart of the third embodiment of this method according to the present invention. The first step of the third embodiment is binding an app to the BIP server 20 by the mobile phone 10 where the app 40 is installed (S21). It is the same as the first step of the first embodiment and the second embodiment so that the details are not mentioned again here. The second step of the second embodiment is delivering a decrypting request command with an encrypted object to the BIP server 20 by the mobile phone 10 (S22). This step is different from the second step of the second embodiment. The request command sent is specified to ask for a decryption on the encrypted object.

Figure 6:
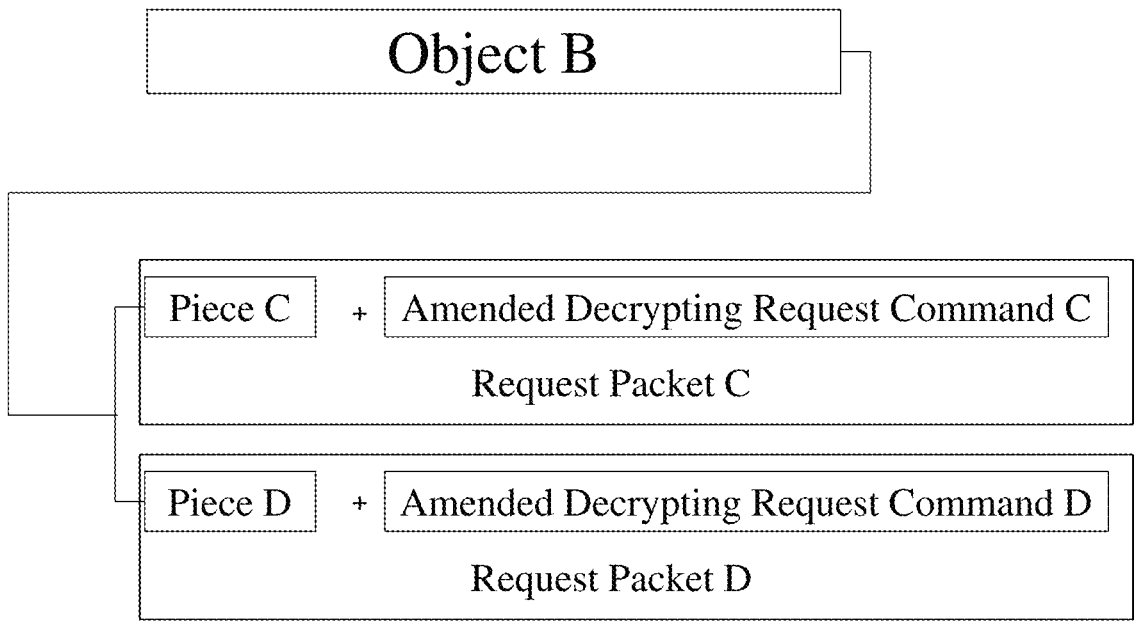
FIG. 6 illustrates how an encrypted object is changed by a BIP server.

Next, the third step of the third embodiment is cutting the object into a plurality of pieces, converting a plurality of amended decrypting request commands in an APDU format from the decrypting request command, and packing each amended decrypting request command with a specific piece in a request packet, respectively, by the BIP server 20 (S23). In order to have a better understanding on this step, please refer to FIG. 6. It illustrates how the encrypted object is changed by the BIP server 20. In FIG. 6, an object B is cut into two pieces, piece C and piece D. The cutting method is the same as what is disclosed in the second embodiment. The BIP server 20 will assign one amended decrypting request command in the APDU format for each piece. In FIG. 6, an amended decrypting request command C is attached to piece C and the amended decrypting request command C and piece C are packed in a request packet C. An amended decrypting request command D is attached to piece D and the amended decrypting request command D and piece D are packed in a request packet D. The amended decrypting request command C and the amended decrypting request command D will not only inform the SIM 11 to decrypt the attached piece but also have a message of connection that piece C and piece D are a part of the object B. Packing method is the same as what is disclosed in the first embodiment. It is not repeated again.

The fourth step of the third embodiment is delivering one request packet to an IP of the SIM 11 by the BIP server 20 via the mobile network 1 (S24). The purpose of the step S24 is also to deliver a request packet at a time.

Next, a fifth step of the third embodiment is receiving and unpacking the request packet to have the amended decrypting request command and corresponding piece, and providing the amended decrypting request command with the piece to the SIM 11 by the mobile phone 10 (S25). Now, the request packet C is received and unpacked by the mobile phone 10, and the amended decrypting request command C and the piece C are provided to the SIM 11.

Then, the sixth step is executing the amended decrypting request command to decrypt the piece according to an encryption algorithm to have an initial result by the SIM 11 (S26). The amended decrypting request command C is executed so that piece C is decrypted. Similarly, the encryption algorithm can be AES or RSA. The decrypted piece C is the initial result. The coming step of the third embodiment is packing the initial result in a response packet and delivering the response packet to the mobile phone 10 by the SIM 11 (S27). The response packet comprising piece C with some other description which may be in the form of header and footer is sent to the mobile phone 10. The eighth step is delivering the response packet to the BIP server 20 via the mobile network 1 by the mobile phone 10 (S28). It is similar to step S18.

Next, the ninth step of the third embodiment is repeating the step S14 to the step S18 for the other request packet (S29). It means delivering request packet D is delivered to the IP of the SIM 11 by the BIP server 20 via the mobile network 1, the mobile phone 10 receives and unpacks the request packet D to have the amended decrypting request command D and corresponding piece D, and provides the amended decrypting request command D with the piece D to the SIM 11, the SIM 11 executes the amended decrypting request command D to decrypt piece D according to the encryption algorithm to have another initial result, the SIM 11 packs the initial result in another response packet and delivers the response packet to the mobile phone 10, and the mobile phone 10 is further delivers the response packet to the BIP server 20 via the mobile network 1. The final step of the third embodiment is unpacking the response packets to fetch the initial results, combining the decrypted pieces as a decrypted object in a final result, and delivering the final result to the mobile phone 10 for the app 40 by the BIP server 20 (S30). In the BIP server 20, both response packets are unpacked, and corresponding initial results are obtained. The decrypted piece C and decrypted piece D are fetched and combined to have the original object. The object is finally packed as the final result which is delivered to the mobile phone 10 for the app 40 to use.

As mentioned earlier, the binding between the app 40 (through the mobile phone 10) and the BIP server 20 is also a portion of the present invention. Below describes how the binding is achieved.

Figure 7:
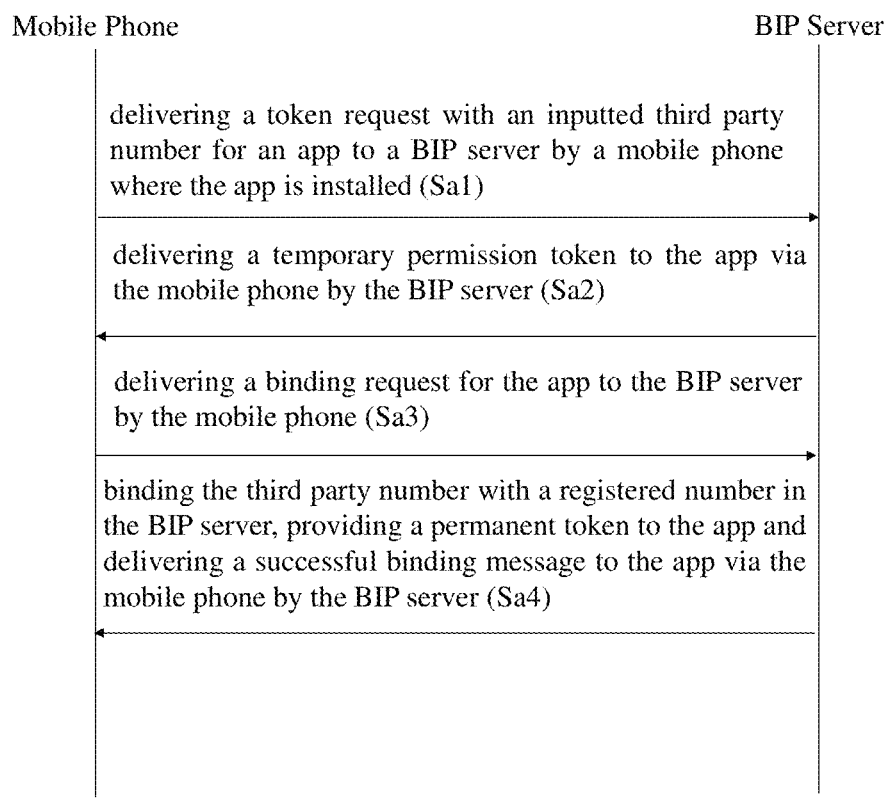
FIG. 7 is a flow chart of a binding procedure according to the present invention.

Please see FIG. 7. It is a flow chart of a binding procedure according to the present invention. It should be emphasized that all the steps of the binding procedure are applied before the first step in the embodiments above. The first step of the binding procedure is delivering a token request with an inputted third party number for an app to a BIP server by a mobile phone where the app is installed (Sa1). The token request is a certificate for the app 40 and used to ask a temporary permission from the BIP server 20. The third party number is given by the user of the app 40 for use in the registration in the future. The second step of the binding procedure is delivering a temporary permission token to the app 40 via the mobile phone 10 by the BIP server 40 (Sa2). When the temporary permission token is sent, it means the app 40 is accepted by the BIP server 40. However, the binding relationship is not established now. The third step of the binding procedure is delivering a binding request for the app 40 to the BIP server 20 by the mobile phone 10 (Sa3). This step is formally to ask the BIP server to build the binding. Then, the fourth step of the binding procedure is binding the third party number with a registered number in the BIP server 20, providing a permanent token to the app 40 and delivering a successful binding message to the app 40 via the mobile phone 10 by the BIP server 20 (Sa4). When binding is successful in the BIP server 20, the registered number will be generated and bound to the third party number by the BIP server 20. Meanwhile, the app 40 will receive the permanent token for confirmation and the binding message to show to the user.

However, if binding is not successful due to communication, the binding procedure has below processes. There are further three steps: delivering a failed binding message with a binding code to the app 40 via the mobile phone 10 by the BIP server 20 when the step a4) is failed; delivering the binding code to the BIP server 20 for rebinding by the mobile phone 10; and binding the third party number with a registered number in the BIP server 20 again, providing another permanent token to the app 40 and delivering a successful binding message to the app 40 via the mobile phone 10 by the BIP server 20.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for implementing requests from an app by a SIM in a mobile phone, comprising the steps of:
    a) binding an app to a bearer independent protocol (BIP) server by a mobile phone where the app is installed;
    b) delivering a request command to the BIP server from the mobile phone by the app;
    c) converting the format of the request command to an Application Protocol Data Unit (APDU) format, packing the converted request command in the APDU format in a request packet, and delivering the request packet to an IP of a SIM by the BIP server via a mobile network;
    d) receiving and unpacking the request packet to have the converted request command, and providing the converted request command to the SIM by the mobile phone;
    e) executing the request command to have a result by the SIM;
    f) delivering the result in a response packet to the BIP server via the mobile network relayed by the mobile phone by the SIM;
    g) unpacking the response packet to fetch the result, and delivering the result to the mobile phone for the app by the BIP server,
    wherein Data delivered between the SIM and the BIP server via the mobile phone is encrypted.

2. The method according to claim 1, wherein data between the BIP server and the mobile phone is conformed to Hyper Text Transfer Protocol (HTTP).

3. The method according to claim 1, wherein the result unpacked from the response packet is further converted to a format of JSON.

4. The method according to claim 1, wherein the communication processes between the mobile phone and the BIP server are further encrypted according to Hyper Text Transfer Protocol Secure (HTTPS) protocol.

5. The method according to claim 1, wherein the request command is verifying an attached Personal Identification Number (PIN) and the SIM compares the PIN with a preset value.

6. The method according to claim 1, wherein the request command is selecting a file and the SIM provides names of all files stored therein as the result.

7. The method according to claim 1, wherein the request command is reading a selected file and the SIM provides the selected file stored therein as the result.

8. The method according to claim 1, wherein a type of the SIM is a slim SIM, an eSIM, an integrated SIM (iSIM) or a SIM card.

9. The method according to claim 1, the step a) further comprises sub-steps of:
    a1) delivering a token request with an inputted third party number for an app to a BIP server by a mobile phone where the app is installed;
    a2) delivering a temporary permission token to the app via the mobile phone by the BIP server;
    a3) delivering a binding request for the app to the BIP server by the mobile phone; and
    a4) binding the third party number with a registered number in the BIP server, providing a permanent token to the app and delivering a successful binding message to the app via the mobile phone by the BIP server.

10. The method according to claim 9, further comprising steps of:
    a5) delivering a failed binding message with a binding code to the app via the mobile phone by the BIP server when the step a4) is failed;
    a6) delivering the binding code to the BIP server for rebinding by the mobile phone; and
    a7) binding the third party number with a registered number in the BIP server again, providing another permanent token to the app and delivering a successful binding message to the app via the mobile phone by the BIP server.

11. A method for implementing requests from an app by a SIM in a mobile phone, comprising the steps of:
    a) binding an app to a BIP server by a mobile phone where the app is installed;
    b) delivering an encrypting request command with an object to the BIP server by the mobile phone;
    c) cutting the object into a plurality of pieces, converting a plurality of amended encrypting request commands in an APDU format from the encrypting request command, and packing each amended encrypting request command with a specific piece in a request packet, respectively, by the BIP server;
    d) delivering one request packet to an IP of a SIM by the BIP server via a mobile network;
    e) receiving and unpacking the request packet to have the amended encrypting request command and corresponding piece, and providing the amended encrypting request command with the piece to the SIM by the mobile phone;
    f) executing the amended encrypting request command to encrypt the piece according to an encryption algorithm to have an initial result by the SIM;
    g) packing the initial result in a response packet and delivering the response packet to the mobile phone by the SIM;

h) delivering the response packet to the BIP server via the mobile network by the mobile phone;
i) repeating the step d) to the step h) for the other request packet; and
j) unpacking the response packets to fetch the initial results, combining the encrypted pieces as an encrypted object in a final result, and delivering the final result to the mobile phone for the app by the BIP server,
wherein Data delivered between the SIM and the BIP server via the mobile phone is encrypted.

12. The method according to claim 11, wherein data between the BIP server and the mobile phone is conformed to Hyper Text Transfer Protocol (HTTP).

13. The method according to claim 11, wherein the result unpacked from the response packet is further converted to a format of JSON.

14. The method according to claim 11, wherein the communication processes between the mobile phone and the BIP server are further encrypted according to Hyper Text Transfer Protocol Secure (HTTPS) protocol.

15. The method according to claim 11, wherein the request command is verifying an attached Personal Identification Number (PIN) and the SIM compares the PIN with a preset value.

16. The method according to claim 11, wherein the request command is selecting a file and the SIM provides names of all files stored therein as the result.

17. The method according to claim 11, wherein the request command is reading a selected file and the SIM provides the selected file stored therein as the result.

18. The method according to claim 11, wherein the encryption algorithm is Advanced Encryption Standard (AES) or Rivest-Shamir-Adleman (RSA).

19. The method according to claim 11, wherein a type of the SIM is a slim SIM, an eSIM, an integrated SIM (iSIM) or a SIM card.

20. The method according to claim 11, the step a) further comprises sub-steps of:
   a1) delivering a token request with an inputted third party number for an app to a BIP server by a mobile phone where the app is installed;
   a2) delivering a temporary permission token to the app via the mobile phone by the BIP server;
   a3) delivering a binding request for the app to the BIP server by the mobile phone; and
   a4) binding the third party number with a registered number in the BIP server, providing a permanent token to the app and delivering a successful binding message to the app via the mobile phone by the BIP server.

21. The method according to claim 20, further comprising steps of:
   a5) delivering a failed binding message with a binding code to the app via the mobile phone by the BIP server when the step a4) is failed;
   a6) delivering the binding code to the BIP server for rebinding by the mobile phone; and
   a7) binding the third party number with a registered number in the BIP server again, providing another permanent token to the app and delivering a successful binding message to the app via the mobile phone by the BIP server.

22. A method for implementing requests from an app by a SIM in a mobile phone, comprising the steps of:
   a) binding an app to a BIP server by a mobile phone where the app is installed;
   b) delivering a decrypting request command with an encrypted object to be decrypted to the BIP server by the mobile phone;
   c) cutting the object into a plurality of pieces, converting a plurality of amended decrypting request commands in an APDU format from the decrypting request command, and packing each amended decrypting request command with a specific piece in a request packet, respectively, by the BIP server;
   d) delivering one request packet to an IP of a SIM by the BIP server via a mobile network;
   e) receiving and unpacking the request packet to have the amended decrypting request command and corresponding piece, and providing the amended decrypting request command with the piece to the SIM by the mobile phone;
   f) executing the amended decrypting request command to decrypt the piece according to an encryption algorithm to have an initial result by the SIM;
   g) packing the initial result in a response packet and delivering the response packet to the mobile phone by the SIM;
   h) delivering the response packet to the BIP server via the mobile network by the mobile phone;
   i) repeating the step d) to the step h) for the other request packet; and
   j) unpacking the response packets to fetch the initial results, combining the decrypted pieces as a decrypted object in a final result, and delivering the final result to the mobile phone for the app by the BIP server,
   wherein Data delivered between the SIM and the BIP server via the mobile phone is encrypted.

23. The method according to claim 22, wherein data between the BIP server and the mobile phone is conformed to Hyper Text Transfer Protocol (HTTP).

24. The method according to claim 22, wherein the result unpacked from the response packet is further converted to a format of JSON.

25. The method according to claim 22, wherein the communication processes between the mobile phone and the BIP server are further encrypted according to Hyper Text Transfer Protocol Secure (HTTPS) protocol.

26. The method according to claim 22, wherein the request command is verifying an attached Personal Identification Number (PIN) and the SIM compares the PIN with a preset value.

27. The method according to claim 22, wherein the request command is selecting a file and the SIM provides names of all files stored therein as the result.

28. The method according to claim 22, wherein the request command is reading a selected file and the SIM provides the selected file stored therein as the result.

29. The method according to claim 22, wherein the encryption algorithm is Advanced Encryption Standard (AES) or Rivest-Shamir-Adleman (RSA).

30. The method according to claim 22, wherein a type of the SIM is a slim SIM, an eSIM, an integrated SIM (iSIM) or a SIM card.

31. The method according to claim 22, the step a) further comprises sub-steps of:
   a1) delivering a token request with an inputted third party number for an app to a BIP server by a mobile phone where the app is installed;
   a2) delivering a temporary permission token to the app via the mobile phone by the BIP server;
   a3) delivering a binding request for the app to the BIP server by the mobile phone; and a4) binding the third party number with a registered number in the BIP server, providing a permanent token to the app and delivering a successful binding message to the app via the mobile phone by the BIP server.

32. The method according to claim 31, further comprising steps of:

a5) delivering a failed binding message with a binding code to the app via the mobile phone by the BIP server when the step a4) is failed;

a6) delivering the binding code to the BIP server for rebinding by the mobile phone; and a7) binding the third party number with a registered number in the BIP server again, providing another permanent token to the app and delivering a successful binding message to the app via the mobile phone by the BIP server.

* * * * *